(12) United States Patent
Valerio et al.

(10) Patent No.: US 9,327,774 B2
(45) Date of Patent: May 3, 2016

(54) MOUNT APPARATUS FOR ROLLOVER PROTECTION SYSTEM

(71) Applicant: Caterpillar Inc., Peoria, IL (US)

(72) Inventors: Micheal Valerio, Morton, IL (US); Eric Ogden, Peoria, IL (US); Florin Smeu, Dunlap, IL (US); Jason Forck, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 18 days.

(21) Appl. No.: 14/507,154

(22) Filed: Oct. 6, 2014

(65) Prior Publication Data
US 2016/0096553 A1 Apr. 7, 2016

(51) Int. Cl.
*B60N 99/00* (2006.01)
*B62D 33/06* (2006.01)
*E02F 9/08* (2006.01)
*B60R 21/13* (2006.01)

(52) U.S. Cl.
CPC .......... *B62D 33/0617* (2013.01); *B60R 21/131* (2013.01); *B62D 33/0604* (2013.01); *E02F 9/0808* (2013.01)

(58) Field of Classification Search
CPC .......... B62D 33/0617; B62D 33/0604; B60R 21/131; E02F 9/0808
See application file for complete search history.

(56) References Cited

U.S. PATENT DOCUMENTS

| | | | |
|---|---|---|---|
| 6,340,201 B1 | 1/2002 | Higuchi | |
| 8,430,426 B2 | 4/2013 | Rasset et al. | |
| 8,678,120 B2 | 3/2014 | Shimomura et al. | |
| 8,807,633 B2 * | 8/2014 | Milburn | B62D 33/0604 280/756 |
| 8,911,003 B2 * | 12/2014 | Selent | 180/89.12 |
| 9,205,877 B2 * | 12/2015 | Stegawski | B62D 27/06 |
| 2014/0292014 A1 * | 10/2014 | Christianson | B62D 33/0604 296/35.3 |
| 2014/0361566 A1 * | 12/2014 | Oh | B62D 33/0604 296/35.1 |

FOREIGN PATENT DOCUMENTS

WO WO 2012158146 A1 * 11/2012 ........... B62D 33/077

* cited by examiner

*Primary Examiner* — Lori L Lyjak (57) ABSTRACT

A mounting structure for mounting a cab enclosure incorporating a ROPS therein to a frame of a construction machine allowing accessibility thereto from inside the cab enclosure. More specifically, the present disclosure provides a mounting structure for a cab enclosure incorporating a ROPS, the mounting structure including an isolation mount therein, the mounting structure providing desired structural rigidity to the ROPS while providing desired vibration damping characteristics to the cab enclosure and while allowing accessibility for service thereto.

20 Claims, 6 Drawing Sheets

MOUNT APPARATUS FOR ROLLOVER PROTECTION SYSTEM

TECHNICAL FIELD

The present disclosure generally relates to mounts for use in mounting a cab enclosure of a vehicle, such as a construction vehicle, to a frame thereof, and more particularly, to a mounting structure for mounting a cab enclosure incorporating a rollover protection structure to a frame of a construction vehicle.

BACKGROUND

Integral cab rollover protection structures (ROPS) are useful to protect the operator of vehicles working in rugged environments from vibration, noise and also from injury in the event of vehicle rollover or other forces asserted on the protection structure. Typically the cab will be formed of sheet metal material and secured to the ROPS to create the cab enclosure. The ROPS may be external to the cab (external ROPS) or internal to the cab (internal ROPS). The ROPS are generally designed to withstand the forces encountered during potential vehicle rollovers. Therefore, the mounting structures for the ROPS are generally designed to transfer any forces that may be applied thereto into the frame with a hard connection and, as such, may be bolted directly to the frame to provide the necessary structural rigidity to withstand the forces of potential rollovers.

Given this hard connection, it has been found that undesirable vibration and noise may be transmitted to the cab enclosure. Accordingly, in order to provide the operator of the machine with a comfortable experience, as well as to prevent potential operator error and/or damage to electronic or pneumatic equipment within the cab enclosure, it is known to incorporate vibration isolating mounts in the mounting structures for the ROPS. For example, U.S. Pat. No. 8,182,024, issued on May 22, 2012 and assigned to Caterpillar, Inc., discloses such a mount for a ROPS. More specifically, the '024 patent discloses a plurality of vibration damping mechanisms configured to at least partially inhibit transmission of shocks and vibrations between the sub-frame and the cab for the construction machine including the ROPS while still providing a rigid connection between the machine supporting frame. However, while mounts such as those disclosed in the '024 patent have been successful in limiting transmission of undesirable noise and vibration to the cabs, service requiring removal of the cab (including the ROPS attached thereto), may be difficult due to the mounting structures.

SUMMARY

The present disclosure is directed to mounting structures for use in mounting a cab enclosure of a vehicle, such as a construction vehicle, to a frame thereof, and more particularly, to a mounting structure for mounting a cab incorporating a ROPS to a frame of a construction vehicle using a multiple plate structure that may be relatively easily accessed for service thereto.

More specifically, the present disclosure comprises a mounting structure for a cab enclosure for a construction machine incorporating a ROPS therein that provides structural rigidity and vibration isolation properties that allows relatively easy access thereto for disconnection in the event of service (or for other purposes) requiring removal of the cab enclosure from the frame of the vehicle wherein multiple plates are used, namely a cab mounting plate and an intermediate plate, that are attached to each other to provide structural rigidity while still allowing mounting of an isolation mount thereto.

In particular, the present disclosure provides a mounting structure for mounting a cab enclosure on a vehicle frame comprising an upper mount, an adapter mount, an intermediate mount, and a lower mount. In accordance therewith, the lower mount disclosed may be secured to a construction vehicle frame and may include a support connected to the intermediate mount. The intermediate mount may have an isolation mount attached thereto or therein and may include a slot or orifice for slidingly receiving a portion of a supplemental support attached to the adapter mount. The adapter mount may be securely attached to a vibration damper, such as a shock absorber, and includes fastening mounts therein for securely attaching the upper mount thereto. The upper mount may be located inside the cab enclosure and allow access to the fasteners securely fastening the upper mount to the adapter mount by a service person from inside the cab enclosure.

More specifically, the present disclosure provides a mounting structure for use in accordance with the foregoing providing a cab mounting portion comprising a cab mounting (adapter) plate and an intermediate plate. The intermediate plate and adapter plate may be mounted with respect to each other such that some relative vertical and horizontal movement therebetween, as controlled by an isolation mount, is allowed while still providing additional rigid support to the cab enclosure to the frame of the machine in a roll-over event.

More specifically, the adapter plate may have a downwardly depending support element securely attached thereto shaped to be slidably and securely received within a slot formed in the intermediate plate. In accordance with the disclosure, the slot may be shaped to allow some vertical and horizontal movement of the downwardly depending support element corresponding to movement allowed by the isolation mount. More particularly, the slot may be formed on a periphery of the intermediate plate and a coupling portion may be provided that may be releasably attached to the periphery of the intermediate plate to prevent disengagement of the support element from the slot such in a roll-over event. An upper mounting plate that may be accessed from the interior of the cab enclosure may be provided having fasteners therethrough for fastening the upper mounting plate, and the cab structure, to the adapter plate, thereby comprising a mounting structure in accordance with the disclosure.

DETAILED DESCRIPTION

Figure 1:
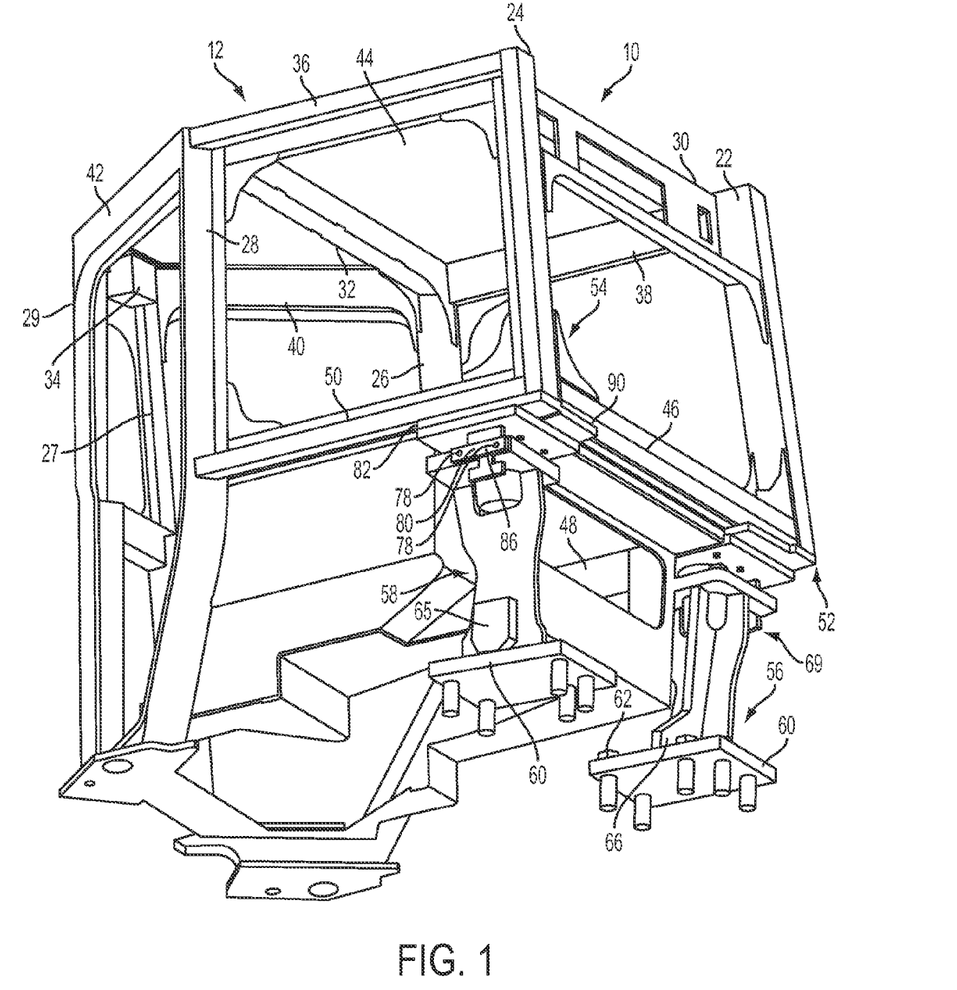
FIG. 1 is a left side perspective view of a cab enclosure of a construction vehicle having a ROPS incorporated therein including a mounting structure in accordance with aspects of the present disclosure.

Referring first to FIG. 1, there is shown a cab enclosure 10 for an internal ROPS 12 for use in connection with a construction machine (not shown) in accordance with aspects of the present disclosure. In accordance with aspects of the disclosure, the cab enclosure 10 may be coupled to a track-type tractor, a hydraulic excavator, a wheel loader, or any other construction machine (or the like) as is known to those of ordinary skill in the art. The cab enclosure 10 may include a suitable station (or stations) for a machine operator (or operators), and may house various controls, displays, and interface equipment for the machine operator (or operators).

In accordance with one embodiment of the disclosure, the ROPS 12 may comprise right and left rear vertical posts 22, 24, right and left intermediate vertical posts 26, 28, and right and left front vertical posts 27, 29. In accordance therewith, the left intermediate vertical post 28 and front right vertical post 29 may form a frame for a door (not shown) to allow ingress and egress for an operator into the cab enclosure 10. Additionally, the ROPS 12 may comprise an upper rear lateral support 30, an upper intermediate lateral support 32, an upper front lateral support 34, an upper rear left longitudinal support 36, an upper rear right longitudinal support 38, an upper front right longitudinal support 40, and an upper front left longitudinal support 42 for supporting a roof 44 of the cab enclosure 10. The right and left rear vertical posts 22, 24 may be mounted to lower lateral rear support 46 and right and left lower longitudinal supports 48, 50 thereby forming the ROPS 12. All of the supports herein disclosed may be formed from hollow tubing (either fully or partially closed) or other structurally stable materials as is known to those of ordinary skill in the art. It is to be understood that the ROPS 12 disclosed specifically herein is shown for exemplary purposes only and that other ROPS 12 and/or cab enclosures 10 would be operable in accordance with aspects of the disclosure.

In one embodiment of the disclosure as shown in FIG. 1, the right and left rear vertical posts 22, 24 of the ROPS 12 are joined to the lower lateral rear support 46 and the right and left lower longitudinal supports 48, 50, respectively forming right and left rear corners 52, 54. Right and left mounting structures 56, 58 may be provided under the corners 52, 54 for mounting the rear portion of the ROPS 12 to the construction vehicle frame (not shown).

Figure 2:
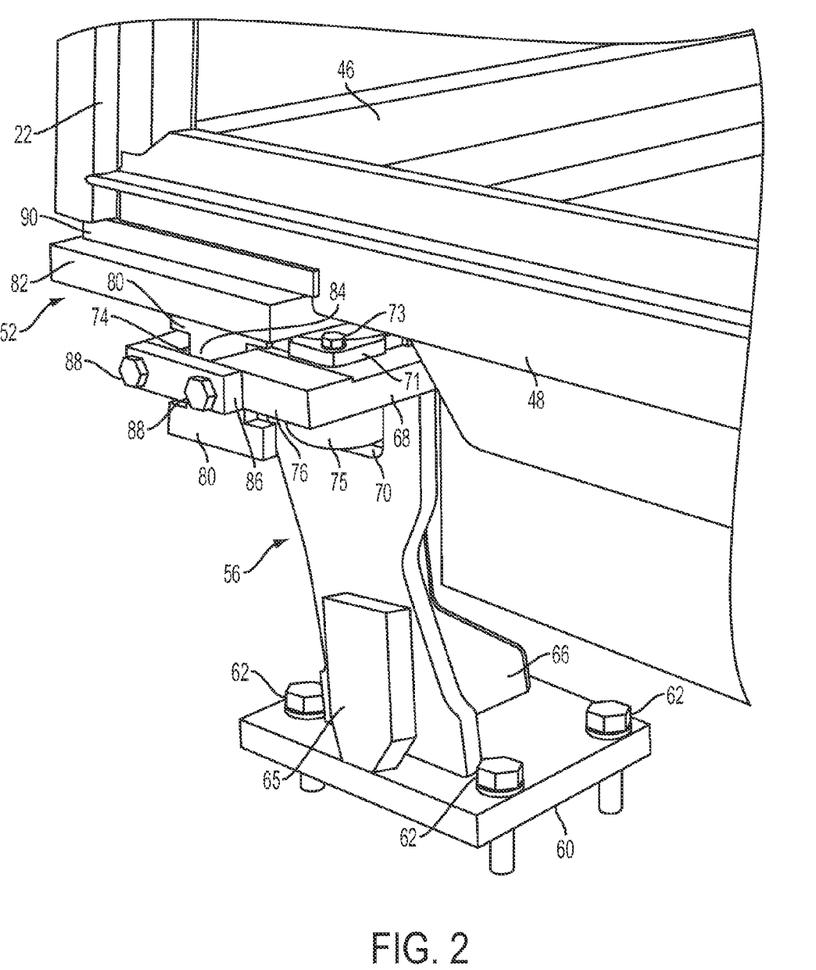
FIG. 2 is a right side perspective detail view of the mounting structure of FIG. 1.
Figure 3:
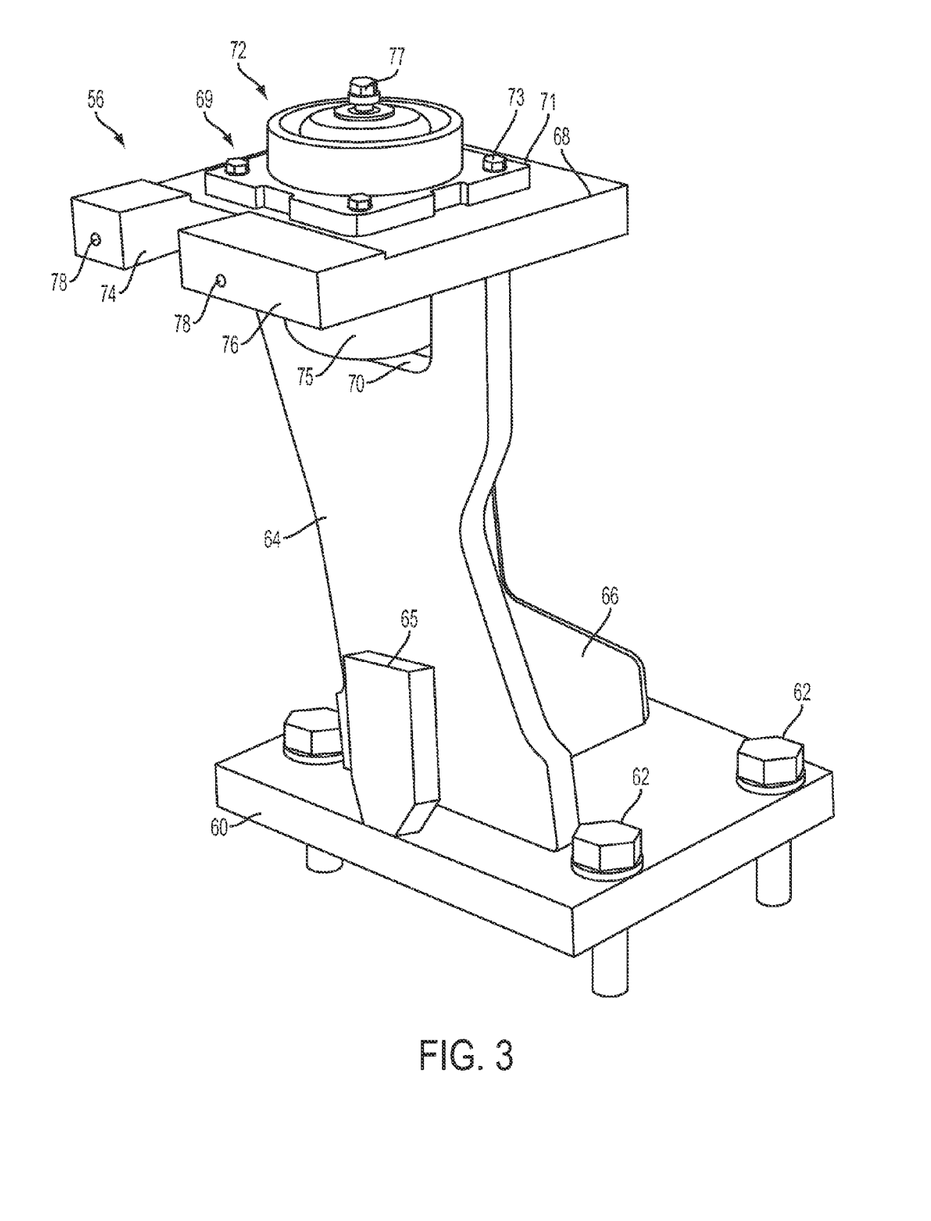
FIG. 3 is a right side perspective detail of the mounting structure of FIG. 2 detached from the cab of FIG. 1.

As shown in FIG. 1, and additionally with reference to FIGS. 2 and 3 (showing only mounting structure 56), the mounting structures 56, 58 may each include a lower mounting portion, or mounting plate 60 that may be secured to the vehicle frame (not shown) with a plurality of bolts 62 or other fasteners. The lower mounting plate 60 may include an upstanding vertical support 64 attached thereto to provide the desired height to the mounting structures 56, 58. The vertical support 64 may be welded or otherwise securely attached to the mounting plate 60 and may comprise a single plate or post, an i-beam structure, a closed or open box structure, a T-shaped structure, or any other structure or configuration necessary to provide the desired support. For example, in the embodiment depicted herein, the vertical support 64 may include a gusset or web 66 to provide additional lateral support thereto and/or a support block 65. The upper portion of the vertical support 64 may be welded to an intermediate plate 68 having an isolation mount 69 operably connected thereto, the isolation mount 69 comprising a mounting flange 71 and a shock absorber assembly 72 mounted inside a can 75. The mounting flange 71 may be releasably secured to the intermediate plate 68 with fasteners, such as bolts 73, as is known in the art. In accordance with aspects of the disclosure, the vertical support 64 may include a recess 70 for receiving the shock absorber assembly 72 depending downwardly from the intermediate plate 68.

As will be known to those of ordinary skill in the art, the structural details of shock absorber assembly 72 may vary, and may be selected from among numerous shock absorber assemblies providing vibration damping characteristics known in the art. For example, the shock absorber assembly 72 may include visco-elastic mechanisms, hydraulic mechanisms, spring mechanisms, etc., configured to constrain movement of a central stud 77 relative to the can portion 75 of the shock absorber assembly 72 through central bore 81 in the adapter plate 82. The shock absorber assembly 72 thus operates to provide a damping effect for any machine vibrations that may be generated in the machine frame during operation of the construction machine thereby substantially isolating the vibrations from the cab enclosure 10.

In order to provide structural rigidity to the mounting structures 56, 58, while still allowing some amount horizontal and vertical movement of the cab enclosure 10 required for the damping of vibrations, the intermediate plate 68 may include an orifice therein, such as a slot 74, for receiving and capturing a portion of a supplemental support 80 therein. As can be seen best in FIGS. 2, 4 and 5, the supplemental support 80 may be fixedly mounted to the cab mounting portion, namely adapter plate 82, and may depend downwardly therefrom. The supplemental support 80 may be attached to the adapter plate 82 in any manner as known in the art, including integral machining, welding, fastening with fasteners, etc. The supplemental support 80 may have a reduced cross-sectional area intermediate portion 84 sized to be received and captured in the slot 74 of the intermediate plate 68. As known to those of ordinary skill in the art, the width and/or length of the intermediate portion 84 of supplemental support and/or slot 74, respectively may be adjusted or varied, as desired, to provide the desired amount of "play" (i.e. respective horizontal and/or vertical movement) and/or additional structural rigidity as may be desired depending on the application in which the mounting structure 56 is used.

As shown best in FIG. 2, the slot 74 may be formed in a periphery of the intermediate plate 68 along a periphery defining edge 76 thereof. A coupling portion 86 may be securely attached to a periphery defining edge 76 in order to "capture" the intermediate portion 84 of supplemental support 80 therein. The coupling portion 86 may be secured thereto by fasteners, such as bolts 88 secured to bores 78 formed therein, thereby releasably coupling the coupling portion 86 to the periphery defining edge 76 of the intermediate plate 68.

While there may be some construction machine applications wherein the shock absorber assembly 72 would be sufficiently robust to support the entire load of the cab enclosure 10 without the need for the additional support provided by a secondary path of rigid support, it has been found that, the use of such shock absorber assemblies may not dampen the machine vibration as sufficiently as desired. In other applications, the size and weight of the cab enclosure 10 (including the size and weight of the ROPS 12) is simply too much to be handled by a shock absorber assembly 72 configuration alone. Accordingly, through the use of a secondary load path such as by means of the supplemental support 80 disclosed herein, sufficient damping and structural rigidity may be achieved, particularly the type of structural rigidity that may be required during a roll-over event to transmit roll-over forces from the cab enclosure 10 to the machine frame, while still allowing some amount of relative movement, as modulated by the shock absorber assembly 72, of the cab enclosure 10 during normal operation of the construction machine.

Figure 4:
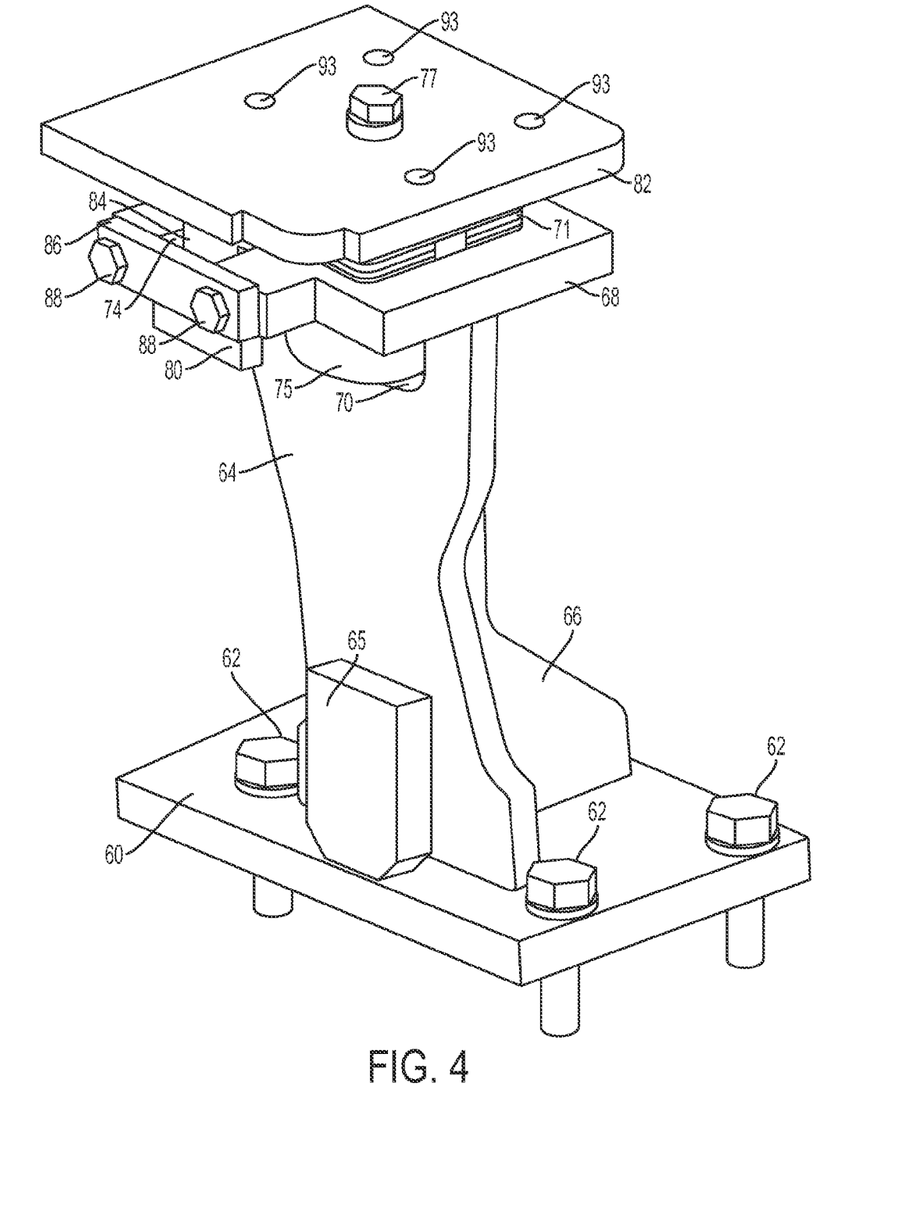
FIG. 4 is a right side perspective detail of the mounting structure of FIG. 3 showing the adapter plate attached thereto.
Figure 5:
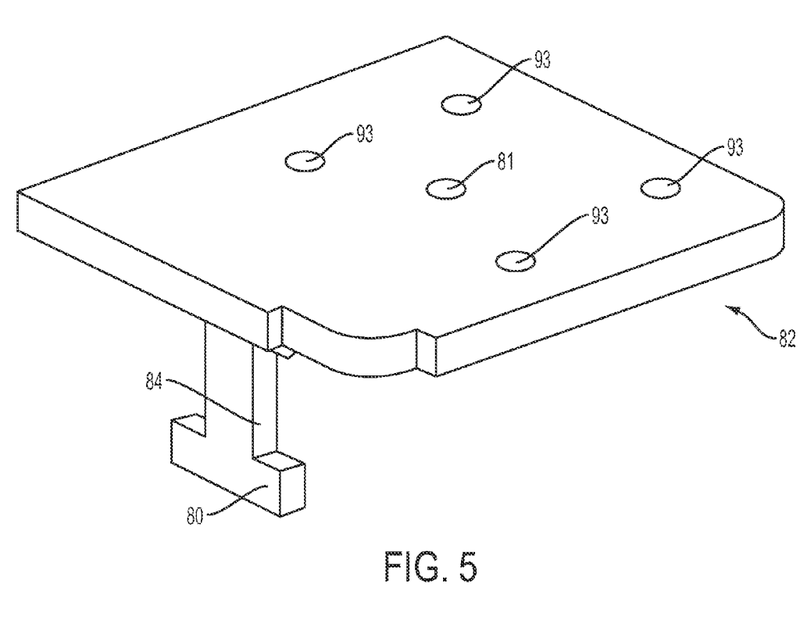
FIG. 5 is a right side perspective detail of the adapter plate of FIG. 4.
Figure 6:
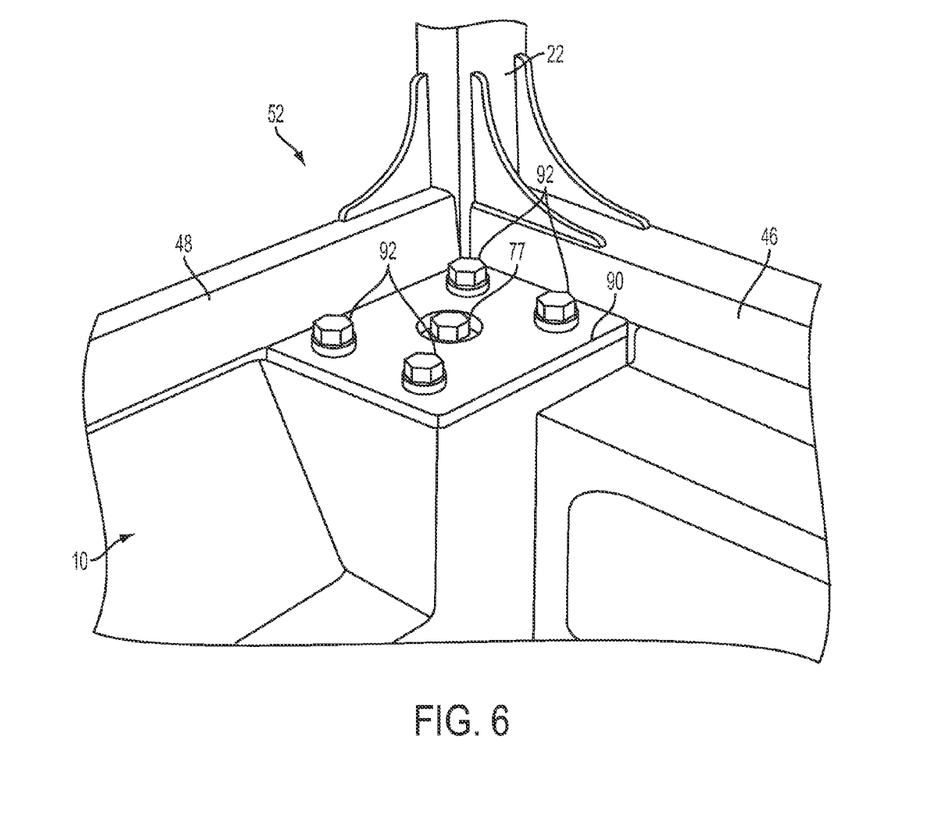
FIG. 6 is a top perspective view of a portion of the mounting structure of FIG. 1 shown from inside the cab enclosure.

As shown in FIGS. 4, 5 and 6, an upper mounting plate 90 may be provided for attaching the cab enclosure 10 to the adapter plate 82 using fasteners 92 secured to bores 93 in the adapter plate 82. In accordance with aspects of the disclosure, the fasteners 92 used to secure the upper mounting plate 90 to the adapter plate 82 may be fastened through a blind connection, such as, for example, threaded bores (or any other known blind connection known in the art), and thus may be easily accessed and disengaged from inside the cab enclosure 10 by a service person.

In accordance with aspects of the disclosure, the cab enclosure 10 may be initially assembled on a construction vehicle frame as follows. The lower mounting plate 60, having the vertical support 64 and intermediate plate 68 (having the isolation mount 69 installed therein) previously attached thereto, may be bolted to the lower support structure of the machine frame (not shown) using bolts 62. Next the adapter plate 82 may be slid over the intermediate plate 68 such that the intermediate portion 84 of supplemental support 80 is received in the slot 74 of the intermediate plate 68. Next, the central stud 77 may be threaded through central bore 81 in adapter plate 82 and secured to the shock absorber assembly 72 and the coupling portion 86 may be bolted to the intermediate plate using bolts 88. Finally, the cab enclosure 10 then may be dropped onto the mounting structures 56, 58 and the upper mounting plate 90 may be attached to the adapter plate 82 using fasteners 92. In this manner, anytime the cab enclosure 10 must be removed from vehicle frame (not shown), a service person need merely to disengage fasteners 92.

In accordance with the foregoing, the mounting structures 56, 58 disclosed herein therefore allow the cab enclosure 10 and corresponding ROPS 12 to be removed from the frame of a construction machine (not shown) without requiring a service person to access any area outside of the cab enclosure 10 while providing a secondary path for distribution of forces from the ROPS 12 to the construction machine frame during a roll-over event.

INDUSTRIAL APPLICABILITY

The disclosed structure and system may be applicable to any type of construction machine where it may be desirable or beneficial to provide a connecting structure between a cab enclosure having a ROPS that facilitates connecting and disconnecting the cab from the supporting frame. The disclosed structure and system also may be applicable to any type of machine where it may be desirable or beneficial to provide a connecting structure between a machine cab enclosure and a machine supporting frame that serves to reliably transfer forces between the cab enclosure and machine supporting frame in the event of machine roll-over. For example, construction machines in which the present disclosure may be operable include, but are not limited to, earthmoving machines, excavation-type machines, mining machines, and the like, that may be employed in earthmoving, excavation, mining, or other operations.

More specifically, the present disclosure may be useful in connection with construction machines where it may be desirable to remove the cab enclosure of such machines from the frame thereof for service or other purposes. Accordingly, ease of accessibility to disconnect such cab enclosures incorporating a ROPS therein is useful while maintaining desired structural rigidity and while isolating of vibration and/or noise from the cab enclosure 10.

More specifically, in connection with aspects of the disclosure, the cab enclosure 10 may be initially assembled on a construction vehicle frame by mounting the lower mounting plate 60 to the lower support structure of the machine frame (not shown). Next the adapter plate 82 may be slid over the intermediate plate 68 such that the intermediate portion 84 of supplemental support 80 is received in the slot 74 of the intermediate plate 68. Next, the central stud 77 may be threaded through central bore 81 in adapter plate 82 and secured to the shock absorber assembly 72 and the coupling portion 86 may be bolted to the intermediate plate using bolts 88. Finally, the cab enclosure 10 then may be dropped onto the mounting structures 56, 58 and the upper mounting plate 90 may be attached to the adapter plate 82 using fasteners 92 thereby connecting cab enclosure 10 securely to the vehicle frame (not shown) with a desired degree of structural rigidity while still maintaining desired vibration damping characteristics.

Further, in accordance with the foregoing, for service to the cab enclosure 10, a service person may enter the cab enclosure 10 and remove fasteners 92. Once corresponding fasteners on the front portion of the construction machine are removed, and any ancillary electric and/or pneumatic connections disconnected, the cab enclosure 10 then may be easily removed from the machine frame for service or other required operations.

The many features and advantages of the disclosure are apparent from the detailed specification, and, thus, it is intended by the appended claims to cover all such features and advantages of the disclosure which fall within its true spirit and scope. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

We claim:

1. A cab enclosure mounting system for a construction vehicle comprising:
    a lower mount configured to be secured to a construction vehicle frame having a support connected thereto;
    an intermediate mount securely fastened to the support, the intermediate mount having an isolation mount attached thereto, the isolation mount including a vibration damper therein;
    an adapter mount, the adapter mount being adapted to be securely attached to the vibration damper and having a supplemental support depending therefrom, the intermediate mount being configured to slidingly receive a portion of the supplemental support; and
    an upper mount configured to be securely attached to the adapter mount.

2. The cab enclosure mounting system of claim 1 wherein the intermediate mount includes a slot therein for slidingly receiving a portion of the supplemental support.

3. The cab enclosure mounting system of claim 1 wherein the supplemental support includes a reduced cross-sectional area intermediate portion configured to be slidably received in the intermediate mount.

4. The cab enclosure mounting system of claim 1 wherein the upper mount is secured to the adapter mount through fasteners that may be accessed from the interior of a cab enclosure.

5. The cab enclosure mounting system of claim 1 wherein the intermediate mount has a periphery defining edge thereon and the periphery defining edge has a slot therein for slidably receiving a portion of the supplemental support.

6. The cab enclosure mounting system of claim 5 further comprising a coupling portion configured to be releasably attached to the periphery defining edge of the intermediate mount to slidingly secure a portion of the supplemental support therein.

7. The cab enclosure mounting system of claim 1 wherein the intermediate mount is secured to the lower mount by a vertical support.

8. The cab enclosure mounting system of claim 7 wherein the vertical support is a plate, post, i-beam, closed box or open box.

9. A construction machine comprising:
- a cab enclosure;
- a frame;
- a mounting structure for mounting the cab enclosure to the frame, the mounting structure comprising a lower mount configured to be secured to the frame having a support connected thereto;
- an intermediate mount securely fastened to the support, the intermediate mount having an isolation mount attached thereto, the isolation mount including a vibration damper therein;
- an adapter mount, the adapter mount being adapted to be securely attached to the vibration damper and having a supplemental support depending therefrom, the intermediate mount being configured to slidingly receive a portion of the supplemental support; and
- an upper mount configured to be securely attached to the adapter mount.

10. The construction machine of claim 9 wherein the intermediate mount includes a slot therein for slidingly receiving a portion of the supplemental support.

11. The construction machine of claim 9 wherein the supplemental support includes a reduced cross-sectional area intermediate portion configured to be slidably received in the intermediate mount.

12. The construction machine of claim 9 wherein the upper mount is secured to the adapter mount through fasteners that may be accessed from the interior of the cab enclosure.

13. The construction machine of claim 9 wherein the intermediate mount has a periphery defining edge thereon and the periphery defining edge has a slot therein for slidably receiving a portion of the supplemental support.

14. The construction machine of claim 13 further comprising a coupling portion configured to be releasably attached to the periphery defining edge of the intermediate mount to slidingly secure a portion of the supplemental support therein.

15. The construction machine of claim 9 wherein the intermediate mount is secured to the lower mount by a vertical support.

16. The construction machine of claim 15 wherein the vertical support is a plate, post, i-beam, closed box or open box.

17. A construction machine comprising:
- a cab enclosure;
- a frame;
- a mounting structure for mounting the cab enclosure to the frame, the mounting structure comprising a lower mounting plate configured to be secured to the frame having a vertical support connected thereto;
- an intermediate plate securely fastened to the vertical support, the intermediate plate having an isolation mount attached thereto, the isolation mount including a shock absorber assembly therein;
- an adapter plate, the adapter plate being adapted to be securely attached to the shock absorber assembly and having a supplemental support depending therefrom, the intermediate plate being configured to slidingly receive a portion of the supplemental support; and
- an upper mounting plate configured to be securely attached to the adapter plate.

18. The construction machine of claim 17 wherein the intermediate plate includes a slot therein for slidingly receiving a portion of the supplemental support.

19. The construction machine of claim 17 wherein the supplemental support includes a reduced cross-sectional area intermediate portion configured to be slidably received in the intermediate plate.

20. The construction machine of claim 9 wherein the upper mounting plate is secured to the adapter plate through fasteners that may be accessed from the interior of the cab enclosure.

* * * * *